(12) United States Patent
Nabeiro et al.

(10) Patent No.: US 11,918,139 B2
(45) Date of Patent: Mar. 5, 2024

(54) SEMIAUTONOMOUS APPARATUS FOR DISTRIBUTION OF EDIBLE PRODUCTS, AND RESPECTIVE OPERATION PROCESS

(71) Applicant: NOVADELTA - COMÉRCIO E INDÚSTRIA DE CAFÉS, LDA, Lisbon (PT)

(72) Inventors: Rui Miguel Nabeiro, Campo Maior (PT); Jesús Medina Mundt, Lisbon (PT); José Miguel De Jesus Estima, Lisbon (PT); Tiago Rafael Da Silva Ferrolho Mendes, Lisbon (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 1025 days.

(21) Appl. No.: 16/646,443

(22) PCT Filed: Sep. 13, 2018

(86) PCT No.: PCT/PT2018/050032
§ 371 (c)(1),
(2) Date: Mar. 11, 2020

(87) PCT Pub. No.: WO2019/054888
PCT Pub. Date: Mar. 21, 2019

(65) Prior Publication Data
US 2020/0288906 A1    Sep. 17, 2020

(30) Foreign Application Priority Data
Sep. 14, 2017   (PT) .......................................... 110286

(51) Int. Cl.
*A47J 31/52* (2006.01)
*A47J 31/36* (2006.01)
(Continued)

(52) U.S. Cl.
CPC ......... *A47J 31/521* (2018.08); *A47J 31/3633* (2013.01); *A47J 31/462* (2013.01);
(Continued)

(58) Field of Classification Search
CPC .. A47J 31/521; A47J 31/5251; A47J 31/5255; A47J 31/462; A47J 31/3633;
(Continued)

(56) References Cited

U.S. PATENT DOCUMENTS 8,509,947 B2 *  8/2013  Jarisch ................. A47J 31/407
                                                         221/96
2002/0165638 A1 * 11/2002  Bancroft ................. G07F 17/16
                                                         700/245
(Continued)

FOREIGN PATENT DOCUMENTS

EP   1 946 684 B1   2/2012
EP   3 037 907 A1   6/2016

OTHER PUBLICATIONS

International Search Report for PCT/PT2018/050032 dated Jan. 17, 2019 [PCT/ISA/210].
(Continued)

*Primary Examiner* — Michael Collins
(74) *Attorney, Agent, or Firm* — Sughrue Mion, PLLC (57) ABSTRACT

The present invention refers to a semiautonomous apparatus (1) for preparation and distribution of edible products, such as for example beverages, that presents a subsystem of preparation of edible products based upon portions (2) of edible substances, for example capsules of roasted and ground coffee for preparing coffee of the espresso type, and comprising at least one brewing device (4), and a subsystem of propulsion and locomotion (5), and further presenting a control device (8) provided so that can control said systems and so that the operation of said brewing device (4) and of (Continued)

said propulsion and locomotion means (5) is mutually exclusive, so that said semiautonomous apparatus (1) does not provide edible products while being moved by respective propulsion and locomotion means (5).

17 Claims, 4 Drawing Sheets

(51) Int. Cl.

| | |
|---|---|
| A47J 31/46 | (2006.01) |
| B60K 1/02 | (2006.01) |
| B60K 1/04 | (2019.01) |
| B60L 50/60 | (2019.01) |
| G05B 19/042 | (2006.01) |
| G05D 1/00 | (2006.01) |
| G05D 1/02 | (2020.01) |
| G06V 20/56 | (2022.01) |
| G06V 40/16 | (2022.01) |
| G07F 13/10 | (2006.01) |
| G10L 17/00 | (2013.01) |

(52) U.S. Cl.
CPC ....... *A47J 31/5251* (2018.08); *A47J 31/5255* (2018.08); *B60K 1/02* (2013.01); *B60K 1/04* (2013.01); *G05B 19/042* (2013.01); *G05D 1/0246* (2013.01); *G06V 20/56* (2022.01); *G06V 40/172* (2022.01); *G07F 13/10* (2013.01); *G10L 17/00* (2013.01); *B60K 2001/0405* (2013.01); *B60L 50/60* (2019.02); *G05B 2219/2645* (2013.01)

(58) Field of Classification Search
CPC .................. B60L 50/60; G05B 19/042; G05B 2219/2645; G05D 1/0246; G10L 17/00; B60K 1/02; B60K 1/04; B60K 2001/0405; G07F 13/10; G06V 20/56; G06V 40/172

See application file for complete search history.

(56) References Cited

U.S. PATENT DOCUMENTS

| | | | |
|---|---|---|---|
| 2004/0019406 A1* | 1/2004 | Wang | H04N 7/142 |
| | | | 700/231 |
| 2010/0100241 A1* | 4/2010 | Jarisch | A47J 31/407 |
| | | | 99/280 |
| 2017/0011580 A1* | 1/2017 | Huang | G06Q 10/30 |
| 2017/0174343 A1* | 6/2017 | Erickson | A61B 5/01 |
| 2018/0321679 A1* | 11/2018 | Nixon | G08G 1/202 |
| 2019/0035044 A1* | 1/2019 | Ferguson | G07C 5/02 |
| 2020/0269743 A1* | 8/2020 | Nabeiro | G07F 13/00 |

OTHER PUBLICATIONS

Written Opinion for PCT/PT2018/050032 dated Jan. 17, 2019 [PCT/ISA/237].

* cited by examiner

SEMIAUTONOMOUS APPARATUS FOR DISTRIBUTION OF EDIBLE PRODUCTS, AND RESPECTIVE OPERATION PROCESS

CROSS REFERENCE TO RELATED APPLICATIONS

This application is a National Stage of International Application No. PCT/PT2018/050032 filed Sep. 13, 2018, claiming priority based on Portuguese Patent Application No. 110286 filed Sep. 14, 2017.

FIELD OF THE INVENTION

The present invention refers to the field of semiautonomous systems comprising own locomotion means, for preparing edible products, in particular beverages, and distribution of other food products.

BACKGROUND OF THE INVENTION

There are known systems of distribution of edible products, notably beverages, by means of apparatuses adapted for processing portions, in particular in the form of capsules comprising a precursor edible substance. Said systems comprise fluid pressurization means, optionally also fluid heating means, and portion collection devices so as to inject a pressurized flow and to collect a beverage downstream of said portion.

Moreover, the prior art includes several solutions relating to mobile devices adapted for distribution of edible products.

Documents WO 2008/063403 A2 and EP 2868243 A1 disclose trolleys for distribution of food and beverages. Said trolleys require exterior locomotion power, in particular being pushed by users thereof.

There are further known solutions of autonomous systems for distribution of edible products.

Documents EP 1946684 B1 and WO 2015/120384 A1 discloses autonomous machines for distribution of food and beverages that include self-propulsion and locomotion means.

In case of document EP 1946684 B1 there is disclosed an autonomous mobile robotic device that comprises a coffee machine integrated in autonomous manner and that operates automatically without requiring any external influence, with exception of a beverage request by a consumer.

In case of document WO 2015/120384 A1, the system comprises at least one self-propelled apparatus and a set of sensors operatively related with the control system of apparatus and for interacting with a user. In particular, said control is configured so that can position a self-propelled apparatus at a given geographic position within a geographic limit boundary, observing by means of a set of sensors at least one consumer within the autonomy range of the apparatus, moving towards the location of user where an interaction between the apparatus and the consumer is facilitated.

However, none of the documents in the prior art discloses a solution that improves the conditions of ergonomic use with relation to the self-propelled displacement movement and cycles of preparation of edible products based upon single portions.

Moreover, there is a need for providing a favourable operation manner of this type of autonomous systems for distribution of edible products, in particular with casual intervention by the users both in the displacement process and in the process of preparation of edible product. That is, for example, without resource to systems for automatically loading capsules into beverage brewing devices.

GENERAL DESCRIPTION OF THE INVENTION

The objective of the present invention is to provide a semiautonomous apparatus for preparation and distribution of edible products, in particular beverages, comprising pressurized flow circulation means and a product preparation device, for example a device adapted for brewing coffee and other aromatic beverages, adapted for collecting a portion of edible substance, for example provided in a capsule or similar, and providing a more efficient and more ergonomic operation.

The aforementioned objective is attained according to the present invention by means of an apparatus according to claim 1.

The semiautonomous apparatus according to the present invention can move automatically by means of autonomous propulsion and locomotion means, supplied by energy storage means, and includes a control device adapted so that only actuates at least one of: pressurized circulation means and said product preparation device, in case having data relating to the non-operation of said autonomous propulsion and locomotion means, so that said apparatus cannot start a cycle of preparation of product if it is moving, and vice-versa.

Moreover, the semiautonomous apparatus according to the present invention presents said propulsion and locomotion means that comprise at least one of: two driving wheels adapted so as to propel the locomotion of at least another wheel, preferentially of two other wheels; at least one and at most four omnidirectional wheels, so that the apparatus can rotate on itself at a location and can reverse the displacement direction or change the displacement direction without needing to do curves.

According to a preferred embodiment, said control device is adapted so that can exchange data by means of at least one of: a short-range communications device, such as for example of type Bluetooth, or similar, and a long-range communications device, of the type 3G, 4G, or similar.

Another objective of the present invention is to provide a process of preparation and distribution of edible products including at least one semiautonomous apparatus in more efficient manner.

The aforementioned objective is attained according to the present invention by means of a process according to claim 13.

In a preferred embodiment of the process, data relating to the determination by a control device of the energy supply to each one of said subsystems are collected by means of surroundings recognition means including image recognition means.

It is further preferred when each cycle of preparation of edible product, further comprises at least one of the steps:
  introduction by the user of a to be used portion through first opening;
  optionally, selection by the user of a to be used portion, preferentially by means of said use interface;
  selection by the user of at least one beverage parameter, preferentially by means of said use interface.

It is preferred when the process according to the invention further includes the steps:
  placement by the user of a beverage recipient upon said second opening;

retention of said beverage recipient on a previously defined position upon said second opening.

It is further preferred when the process further includes the steps:

actuation by the user of said use interface, preferentially of a "start"-type command, so that the propulsion and locomotion means provide movement and the semiautonomous apparatus moves.

DESCRIPTION OF THE FIGURES

The present invention shall now be explained in greater detail based upon preferred embodiments and upon the attached figures.

The Figures show, in schematic representations.

DESCRIPTION OF PREFERRED EMBODIMENTS OF THE INVENTION

A semiautonomous apparatus (1) according to the present invention basically comprises, in the case of a first embodiment (see FIGS. 1 and 2), a subsystem for preparation of edible products and a subsystem for autonomous propulsion and locomotion, whereby the operation of both of said subsystems is controlled by a control device (8), or by respective control devices (8) in operative connection with each other.

Figure 1:
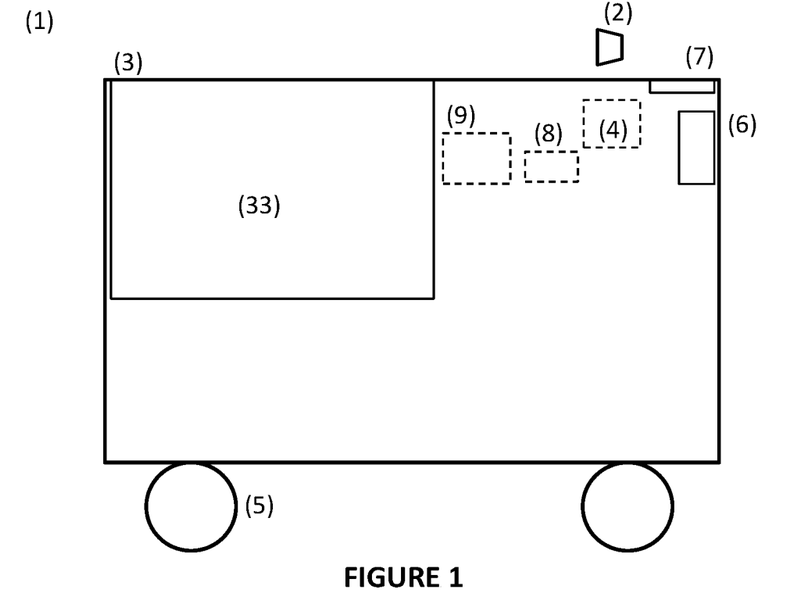
FIG. 1: side view of a first embodiment of an apparatus (1) according to the present invention.
Figure 2:
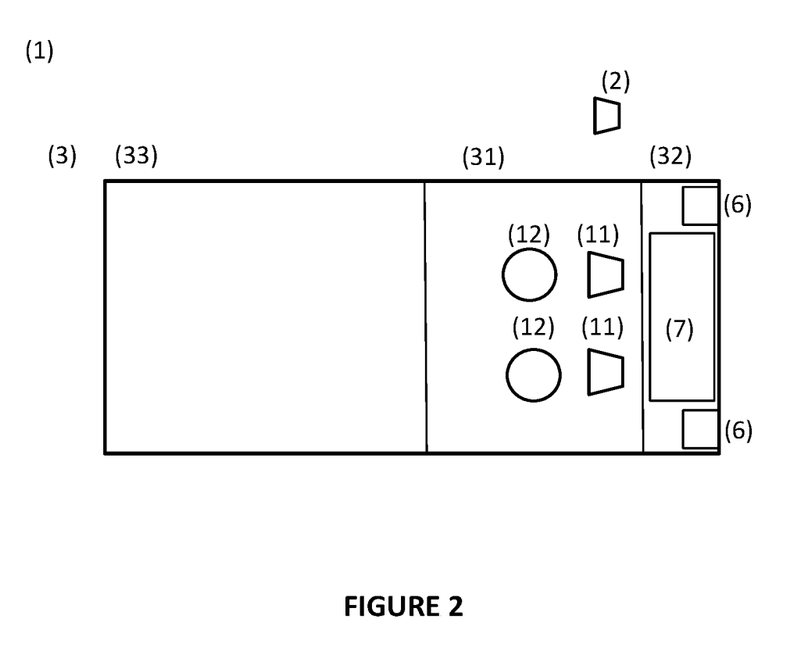
FIG. 2: top view of the apparatus (1) according to FIG. 1.

A casing (3) presents a general parallelepiped-like form that confines inside thereof at least one brewing device (4) adapted so that can collect a portion (2) of edible substance. Besides of said brewing device (4), the subsystem for preparation of edible products further comprises fluid heating and pressurization means (9) that supply a pressurized flow to said brewing device (4).

Moreover, said semiautonomous apparatus (1) presents autonomous propulsion and locomotion means (5), surroundings recognition means (6) and use interface means (7) provided in operational connection with a control device (8).

According to an inventive aspect, said control device (8) is provided so that the operation of said brewing device (4) and of said propulsion and locomotion means (5) is mutually exclusive, so that said apparatus (1) cannot provide edible products while being moved by respective propulsion and locomotion means (5).

Moreover, it is preferred when said control device (8) is provided so that the start of operation of at least one of said pressurized flow circulation means and said brewing device (4), requires an input external to said semiautonomous apparatus (1) and a confirmation of the state of immobilization of said semiautonomous apparatus (1).

It is preferred when said control device (8) is provided so that a start of operation of at least one of said pressurized flow circulation means and brewing device (4), and of said propulsion and locomotion means (5), requires the actuation by a user of a respective start command by means of said use interface (7).

It is preferred when said semiautonomous apparatus (1) further comprises surroundings recognition means (6) provided in data connection with a control device (8), whereby said surroundings recognition means (6) present an optical recognition disposition, preferentially a digital camera, oriented along at least one observation direction so that can optically recognize at least one of: a surrounding space and a user, preferentially previously defined, and provide respective recognition data to said control device (8).

It is further preferred when said control device (8) is configured so that said autonomous propulsion locomotion means (5) can move the semiautonomous apparatus (1) if there is at least one of:

request of edible product by a consumer received through wireless communication means, and recognition of a previously defined user, preferentially by means of facial recognition, by means of said surroundings recognition means (9).

According to a preferred embodiment, said propulsion and locomotion means (5; 51, 52) comprise at least one of:

two drive wheels adapted so as to propel locomotion to at least another wheel, preferentially to two other wheels;

at least one and up to four omnidirectional wheels, so that the apparatus can turn on itself on the same location and can reverse the displacement direction or change the displacement direction, without needing to make curve.

According to another inventive aspect (see FIG. 2), said casing (3) presents a first and second service regions (31, 32) on its top region, whereby said first service region (31) presents a first opening (11) configured so that provides the introduction of said portion (2), as well as a second opening (12) adapted so that provides discharge of resulting edible product. Said first and second openings (11, 12) are preferentially provided on a continuous plane, preferentially devoid of cavities and projection, that extends along at least most part, preferentially the totality of said top region.

Said second service region (32) develops in the vicinity of said first region (31), preferentially in the front region of said casing (3), and presents at least one use interface (7), preferentially provided as a tactile interactive screen and including at least the control commands of the subsystem of preparation of edible products, including a "start" command.

It is preferred when said second service region (32) further presents surroundings recognition means (6) provided as optical means adapted for image recognition (6), whereby at least two of said surroundings recognition means are preferentially provided in side regions of said second service region (32).

It is preferred when said first and second service regions (31, 32) develop along a parallel plane, preferentially along a substantially common plane, or at an angle that does not exceed 45°, preferentially does not exceed 30°.

Said casing (3) can further present a third service region (33) adapted for storage of other edible products, preferentially with supply connection to said product preparation device (4), whereby said third service region (33) is provided with a physical separation from said first and second service regions (31, 32), preferentially a physical separation adapted so that reduces the heat transfer to said third service region (33).

It is preferred when said third service region (33) develops on a second portion of casing (3) in-between and in the vicinity of said first and second service regions (31, 32), so that results an easier use of the semiautonomous apparatus (1).

Figure 3:
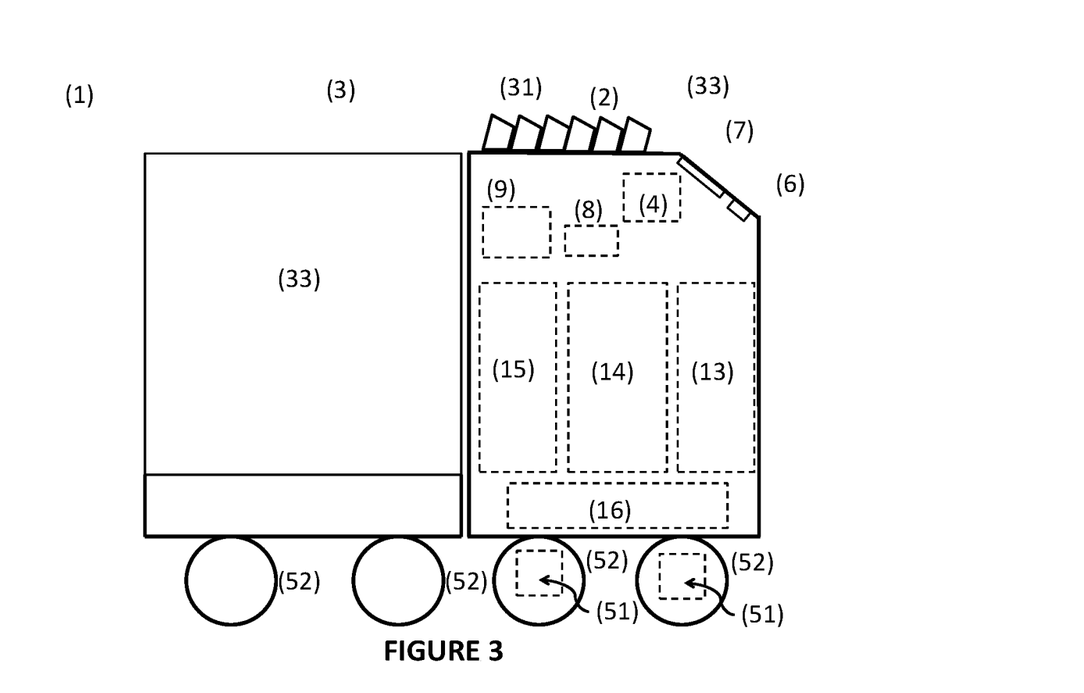
FIG. 3: side view of a second embodiment of an apparatus (1) according to the present invention.
Figure 4:
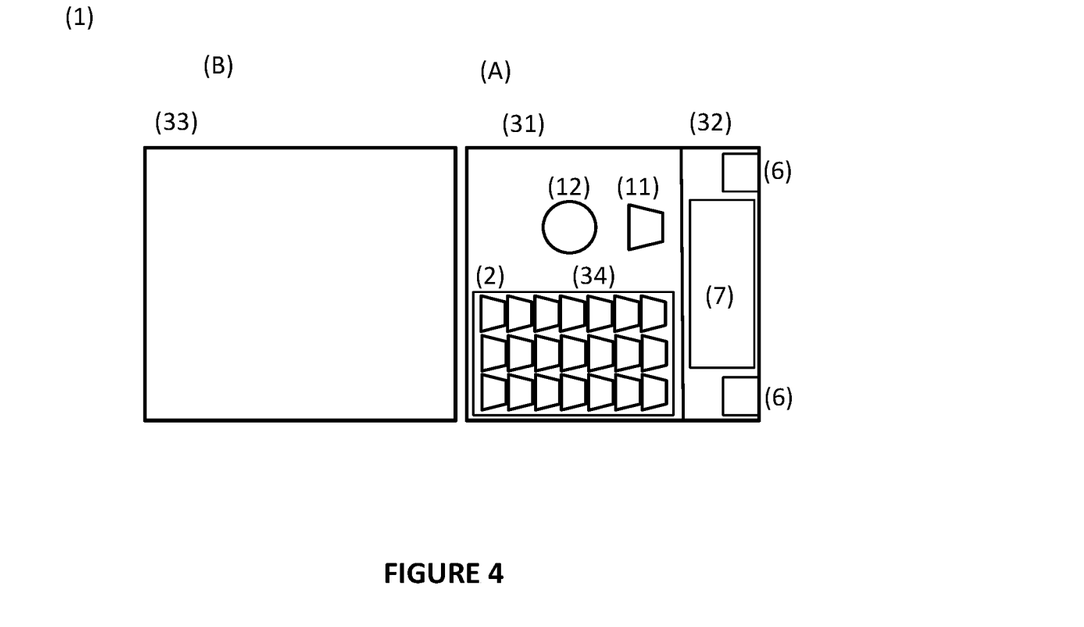
FIG. 4: top view of the apparatus (1) according to FIG. 3.

FIGS. 3 and 4 represent a second preferred embodiment of semiautonomous apparatus (1) according to the present invention.

As represented, said casing (3) in this case comprises a first module that presents said first and second service regions (31, 32) and a second module separated but physically connected with said first module, and that presents said third service region.

Moreover, said first module of casing (3) in this case confines all the elements relating to the subsystem of preparation of edible products based upon single portions (2) of edible substance, for example provided in capsules, as well as a first and second energy storage devices (14, 16).

Said propulsion and locomotion means (5) comprise propulsion device (51), preferentially electric motors, and locomotion elements (52), preferentially wheels, whereby at least part of said locomotion elements (52) is directly associated to a respective propulsion device (51).

Said autonomous propulsion and locomotion means (5; 51, 52) are adapted so that can be supplied with energy from energy storage means (14, 16), whereby said energy storage means (14, 16) are provided physically separated, preferentially in liquid-tight manner, from said subsystem of preparation of edible products, and in at least one of: in-between and at a lower level than said collection container (13) for used portions and fluid supply container (15).

It is preferred when said energy storage means (14, 16) are provided so that can be accessed through a lateral region of said casing (3), preferentially by means of a door-like element, or similar, provided on said casing (3).

As previously referred, the semiautonomous apparatus (1) according to the present invention can present a casing (3) that comprises a first module of casing (3) provided physically separated from, and physically connectable to, a second module of casing (3), whereby said first and second modules of casing (3) present a similar general configuration, preferentially of parallelepiped type, and whereby said first and second service regions (31, 32) are provided on said first module of casing (3), and said third service region (33) is provided on said second module of casing (3).

Said casing (3) can comprise a first module of casing (3) that presents all autonomous propulsion means (51), whereby said first and second modules of casing (3) present respective locomotion means (52).

Said casing (3) can comprise a first module of casing (3) that presents all said energy storage means (14, 16), said fluid supply disposition (9) and said brewing device (4).

It is preferred when said first and second energy storage means (14, 16) are provided in a physically separated compartment that develops underneath and contained within the vertical projection of said first and second service regions (31, 32).

According to a preferred embodiment, said product discharge (12) is provided on said first service region (31), and adapted so that can discharge a product flow along a generally vertical upwards direction, whereby it is preferred when said product discharge (12) provided a cavity adapted for actionable retention of a beverage recipient, preferentially a beverage recipient with a configuration adapted so that can be retained on said product discharge (12).

It is further preferred when said fluid supply disposition (9) is arranged at a lower level with relation to said service regions (31, 32) and above said autonomous propulsion and locomotion means (5; 51, 52).

The semiautonomous apparatus according to the present invention includes a casing (3), said casing (3) further confines a fluid supply disposition (9) provided flow upstream with relation to said brewing device (4), whereby said fluid supply disposition (9) comprises at least one of: a fluid heating device, for example of thermobloc type, boiler, and a fluid pressurization device, for example of the pump type.

Said casing (3) can present a generally parallelepiped, cylindrical shape, or other, configuring a top area that extends at all width and all length at the highest level of said casing (3), said top area comprising a plurality of service regions (31, 32) distributed in coherent manner in the top area of said casing (3).

Said service regions (31, 32) can include a first service region (31) adapted for preparing a beverage and that presents at least one first opening (11) configured so that provided the introduction of said portion (2) and supply thereof to said brewing device (4), and at least a second opening (12) configured for beverage discharge along a vertical upwards direction, through a base region and inside of a beverage recipient, and a second service region (32) adapted for support of said use interface (7), whereby service regions (31, 32) are provided adjacent and so that define a continuous surface, preferentially without presenting projections.

It is preferred when at least one of, preferentially both of, said first and second service regions (31, 32) develop in the highest plane of said semiautonomous apparatus (1).

It is preferred when at least one of said first and second service regions (31, 32) develop along at least one of: a substantially horizontal plane and an oblique plane presenting an inclination smaller than 45° relative to the horizontal.

Moreover, said first and second service regions (31, 32) can develop along a parallel plane, preferentially along a substantially common plane, or at an angle that does not exceed 45°, preferentially that does not exceed 30°.

It is preferred when at least one of said first and second service regions (31, 32) develops on a top region at least in the proximity of a first edge of said casing (3).

It is further preferred when the vertical projection of said first and second service regions (31, 32) develops above a collection compartment (13) for used portions and, preferentially at least partially above of a fluid supply container (15), whereby both of said containers (13, 15) are provided so that can be removed and placed from a lateral face of said casing (3).

Said casing (3) can further present a third service region (33) adapted for storage of other edible products, whereby said third service region (33) is provided with a physical separation from said first and second service regions (31, 32), preferentially a physical separation that reduces the heat transfer to said third service region (33).

It is preferred when said third service region (33) develops on an region of said casing (3) opposite to that of said first and second service regions (31, 32).

It is preferred when said second (32), first (31) and third (33) service regions develop successively along the longitudinal extension of the top region of said casing (3).

It is preferred when said casing (3) further presents a fourth service region (34) adapted for storage of said portions (2), whereby said fourth service region (34) is provided as at least one of: as a region on the top surface of said casing (3) and as an interior space, with lateral or frontal access through said casing (3).

Figure 5:
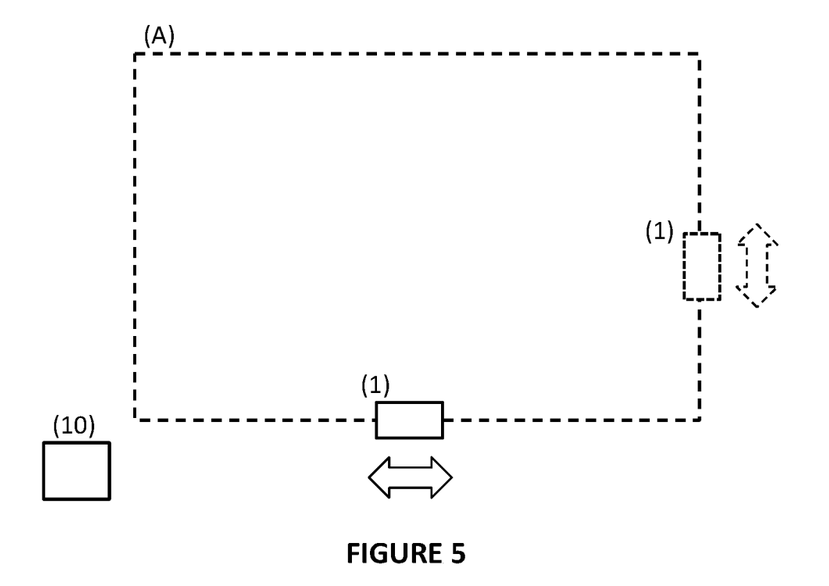
FIG. 5: top view of a first operation space for an apparatus (1) according to the present invention.
Figure 6:
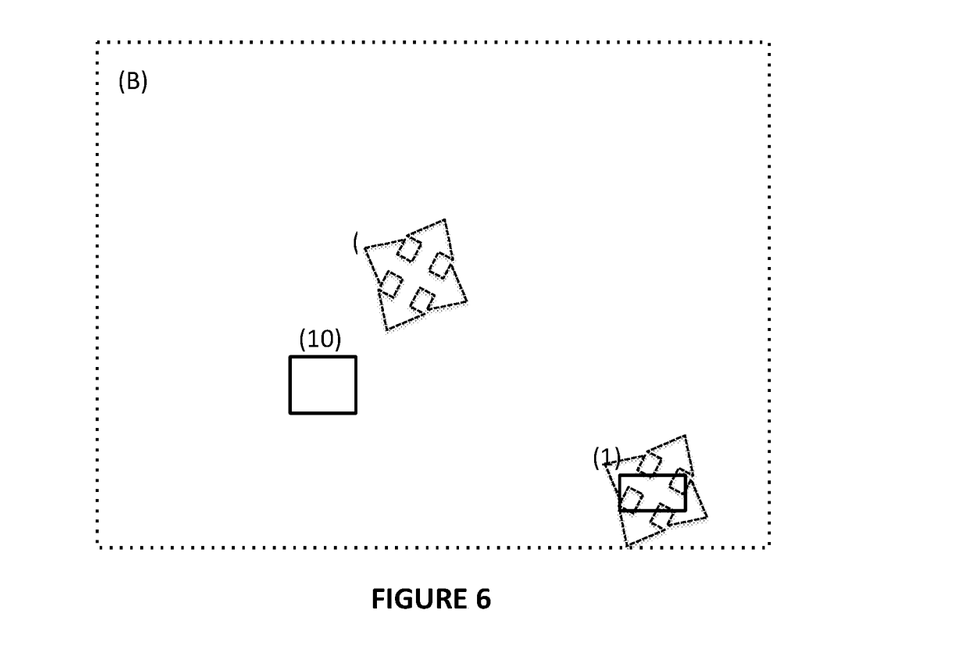
FIG. 6: top view of a second operation space for an apparatus (1) according to the present invention.

According to another inventive aspect, schematically represented in FIGS. 5 and 6, said control device (8) is provided so that can register product requests without requiring the actuation of a stop command of said propulsion and locomotion means through said use interface (7). Moreover, said control device (8) is further provided so that the semiautonomous apparatus (1) moves in at least one of:

- with a previously defined trajectory along an operation path (A), preferentially in closed circuit,
- within a previously defined operation space (B), whereby it is preferred when there is provided a base station (10) on said operation path (A) and/or operation space (B), or in the proximity thereof. Said base station (10) is adapted so that can provide charging of said energy storage means (14, 16).

This type of disposition provides advantages in terms of operation efficiency and reliability, adjusted to the needs of distribution of edible products in different types of situations.

Figure 7:
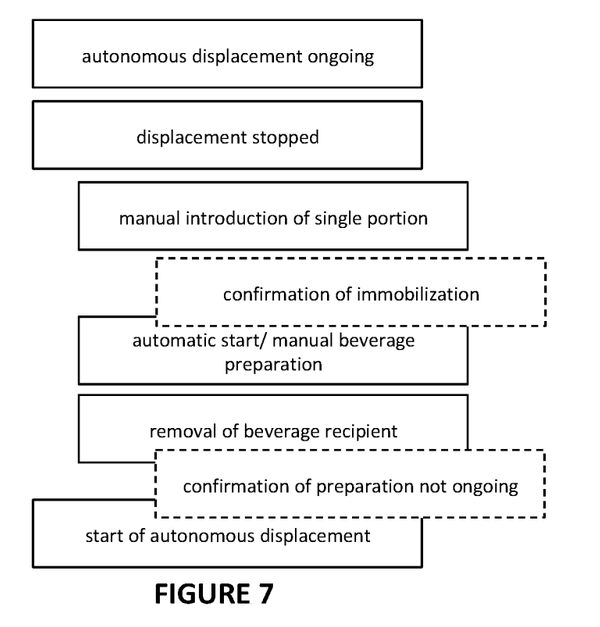
FIG. 7: flux diagram of a first embodiment of a process of operation of an apparatus (1) according to the present invention.

According to another inventive aspect (see FIG. 7), a process of operation further includes for each displacement of the semiautonomous apparatus (1):

- previous confirmation by a control device (8) that a cycle of preparation of edible product is not on-going, for example that energy is not being supplied to said subsystem of preparation of edible products;
- energy supply to said propulsion and locomotion means (5; 51, 52);

and, for each cycle of preparation of edible product, includes the steps:

- previous confirmation by a control device (8) that a displacement of said semiautonomous apparatus (1) is not on-going, for example that energy is not being supplied to said subsystem of propulsion and locomotion;
- insertion by the user of to be used portion (2) through a first opening (11);
- actuation by the user of said use interface (7), preferentially of a "start"-like command, so that the brewing device is actuated (4) and the supply of resulting edible product through a second opening (12) is concluded.

According to a preferred embodiment (see FIG. 8), stopping said semiautonomous apparatus (1) is attained upon user's request, including by recognition by said surroundings recognition means (6) of a previously defined user, or recognition of previously defined data.

Figure 8:
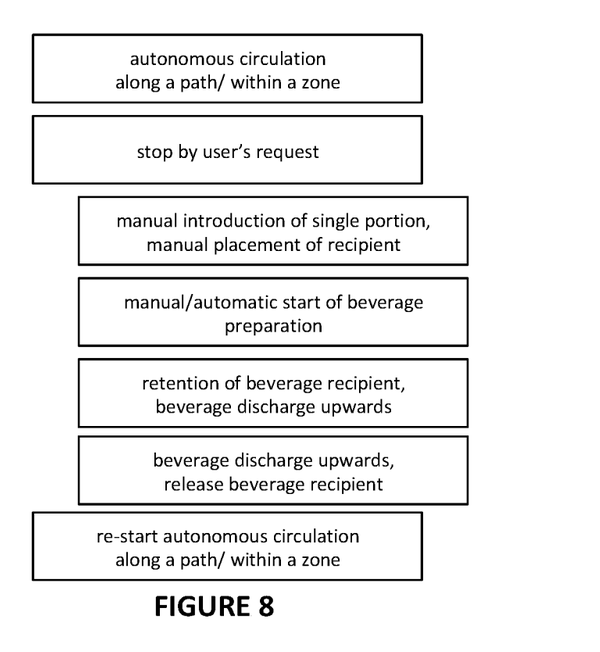
FIG. 8: flux diagram of a second embodiment of a process of operation of an apparatus (1) according to the present invention.

It is further preferred when each cycle of preparation of edible product, in particular a beverage, requires manual placement of the beverage recipient on a respective beverage discharge (12) provided on said first service region (31), followed by an automatic retention of the beverage recipient on said beverage discharge (12), so that beverage discharge upwards through the base of said beverage recipient can be initiated thereafter. After conclusion of the beverage discharge, the mechanic retention of the beverage recipient can be automatically removed so that a user can remove it.

Lisbon, 12 Oct. 2018

The invention claimed is:

1. A semiautonomous apparatus for preparing and distributing edible products based upon a portion of edible substance, the semiautonomous apparatus comprising:
   - a casing confining a pressurized flow circulation and brewing device configured to drive between (i) an open position in which the pressurized flow circulation and brewing device is configured to collect said portion of edible substance, and (ii) a closed position in which the pressurized flow circulation and brewing device is configured to inject pressurized flow upon said portion of edible substance,
   - an autonomous propulsion and locomotion system associated with said casing and disposed in operational connection with a surroundings recognition sensor,
   - a user interface disposed in operational connection with said autonomous propulsion and locomotion system, and
   - a control device disposed in operational connection with said pressurized flow circulation and brewing device and with said autonomous propulsion and locomotion system,
   - wherein said control device is configured so that said pressurized flow circulation and brewing device can only operate in a mutually exclusive manner with said propulsion and locomotion system.

2. The semiautonomous apparatus according to claim 1, wherein said control device is configured so that a start of operation of said pressurized flow circulation and brewing device includes an input external to said semiautonomous apparatus and a confirmation of a state of immobilization of said semiautonomous apparatus.

3. The semiautonomous apparatus according to claim 1, wherein said control device is configured so that a start of operation of at least one of said pressurized flow circulation and brewing device, or of said autonomous propulsion and locomotion system, includes actuation by a user of a respective start command via said user interface, and
   wherein said control device is configured so that a confirmation of a state of immobilization of said semiautonomous apparatus includes actuation by the user of a respective stop command of said autonomous propulsion and locomotion system via said user interface.

4. The semiautonomous apparatus according to claim 1, wherein said control device is disposed in data connection with said surroundings recognition sensor that is disposed on at least one of: a side face of said casting or a top face of said casing, and
   wherein said surroundings recognition sensor comprises an optical recognition disposition oriented along at least one observation direction so that the optical recognition disposition can optically recognize at least one of: a surrounding space or a user, the optical recognition disposition being configured to provide respective recognition data to said control device.

5. The semiautonomous apparatus according to claim 1, wherein said control device is configured to control movement of said autonomous propulsion and locomotion system based upon data obtained by said surroundings recognition sensor, said data including at least one of:
   - physical elements including physiognomic aspects that are characteristic of a previously defined user, and
   - previously defined spatial elements of a surroundings environment.

6. The semiautonomous apparatus according to claim 1, wherein said control device is configured to control operation of said autonomous propulsion and locomotion system, and thereby control movement of said semiautonomous apparatus, along at least one of:
   - operation path with a previously defined trajectory in a closed circuit, or
   - any paths with a non-previously defined trajectory inside of a previously defined operation space, wherein a base station is disposed along said operation path and/or in said operation space.

7. The semiautonomous apparatus according to claim 1, wherein said control device is configured to control said autonomous propulsion and locomotion system to move said semiautonomous apparatus when at least one of:
   a request of the edible products by a consumer is received via wireless communication, and
   recognition of a previously defined user via facial recognition by said surroundings recognition sensor.

8. The semiautonomous apparatus according to claim 1, wherein said user interface comprises an actuator configured to control of at least one of said pressurized flow circulation and brewing device, and said autonomous propulsion and locomotion system, and
   wherein said user interface is a digital touch screen that is continuous with an adjacent surface of said casing.

9. The semiautonomous apparatus according to claim 1, wherein said control device is configured to automatically recognize at least one of:
   the portions of edible substance used in preparation of the edible products,
   previously authorized users via information received from said user interface, or
   requests received via wireless communication with a communications device that has been previously associated with a consumer.

10. The semiautonomous apparatus according to claim 9, wherein said information received from said use interface is associated with facial recognition and/or voice recognition.

11. The semiautonomous apparatus according to claim 9, wherein said requests received via wireless communication are via near-field communications.

12. The semiautonomous s apparatus according to claim 1, wherein said autonomous propulsion and locomotion system comprise electric motors and wheels, wherein at least part of said wheels are directly associated to a respective electric motor of the electric motors.

13. The semiautonomous apparatus according to claim 1, wherein said autonomous propulsion and locomotion system is configured to be supplied with energy from energy storage, said energy storage being physically separated from a subsystem for preparation of the edible products, said energy storage being disposed either (i) in-between a collection container for used edible portions and a fluid supply container or (ii) below the collection container and the fluid supply container, said energy storage being accessible through a lateral region of said casing by a door on said casing.

14. The semiautonomous apparatus according to claim 1, further comprising first energy storage and second energy storage configured to non-simultaneously provide energy supply for preparation of the edible products and to the autonomous propulsion and locomotion system,
   wherein said first energy storage is configured to supply energy only for the preparation of the edible products, and said second energy storage is configured to supply energy only to said autonomous propulsion and locomotion system.

15. A process for preparing and distributing edible products in different locations of an operation space, the process comprising:

providing a semiautonomous apparatus for preparing and distributing the edible products based upon a portion of edible substance, the semiautonomous apparatus including:
   a casing confining a pressurized flow circulation and brewing device configured to drive between (i) an open position in which the pressurized flow circulation and brewing device is configured to collect said portion of edible substance, and (ii) a closed position in which the pressurized flow circulation and brewing device is configured to inject pressurized flow upon said portion of edible substance,
   an autonomous propulsion and locomotion system associated with said casing and disposed in operational connection with a surroundings recognition sensor,
   a user interface disposed in operational connection with said autonomous propulsion and locomotion system, and
   a control device disposed in operational connection with said pressurized flow circulation and brewing device and with said autonomous propulsion and locomotion system,
   wherein said control device is configured so that said pressurized flow circulation and brewing device can only operate in a mutually exclusive manner with said propulsion and locomotion system;
providing energy to an energy storage that is configured to provide energy to (i) a first subsystem for preparing the edible products, the first subsystem including the pressurized flow circulation and brewing device and (ii) a second subsystem of propulsion and locomotion, the second subsystem including the autonomous propulsion and locomotion system,
setting said semiautonomous apparatus in a standby mode to start a displacement of the semiautonomous apparatus and to carry out a cycle of preparation of the edible products in semiautonomous manner;
wherein the displacement of said semiautonomous apparatus comprises:
   receiving previous confirmation by the control device that the cycle of the preparation of the edible product is not on-going such that energy is not being supplied to said first subsystem;
   providing energy supply from the energy storage to said autonomous propulsion and locomotion system; and
wherein the cycle of the preparation of the edible products comprises:
   receiving previous confirmation by the control device that the displacement of said semiautonomous apparatus is not on-going such that energy is not being supplied to said second subsystem;
   receiving insertion of the portion of edible substance through a first opening;
   receiving an actuation signal from said user interface of a command to start actuation of the pressurized flow circulation and brewing device allowing supply of a resulting edible product through a second opening.

16. The process according to claim 15, further comprising selecting an operation mode of said second subsystem from among options of (i) a semiautonomous operation mode that requires a previously defined intervention by a user, and (ii) an autonomous operation mode that does not require the previously defined intervention.

17. The process according to claim 15, further comprising receiving a second actuation signal from said user interface of a command to interrupt operation of said autonomous propulsion and locomotion system allowing said semiautonomous apparatus to immobilizes itself when a user is previously recognized by via a code and/or biophysical data.

* * * * *